United States Patent
Jones et al.

(10) Patent No.: US 7,819,327 B2
(45) Date of Patent: *Oct. 26, 2010

(54) INK WITH COHESIVE FAILURE AND IDENTIFICATION DOCUMENT INCLUDING SAME

(75) Inventors: Robert L. Jones, Andover, MA (US); Bentley Bloomberg, Maynard, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/567,061

(22) Filed: Dec. 5, 2006

(65) Prior Publication Data

US 2007/0158939 A1  Jul. 12, 2007

Related U.S. Application Data

(63) Continuation of application No. 10/329,315, filed on Dec. 23, 2002, now Pat. No. 7,143,950, which is a continuation-in-part of application No. 09/969,200, filed on Oct. 2, 2001, now Pat. No. 6,827,277.

(60) Provisional application No. 60/344,698, filed on Dec. 24, 2001, provisional application No. 60/344,687, filed on Dec. 24, 2001.

(51) Int. Cl.
*G06K 19/02* (2006.01)

(52) U.S. Cl. .......... 235/488; 235/491; 283/109
(58) Field of Classification Search ............ 235/488, 235/491; 283/109
See application file for complete search history.

(56) References Cited

U.S. PATENT DOCUMENTS

| | | | | | |
|---|---|---|---|---|---|
| 3,929,701 | A | * | 12/1975 | Hall et al. | 524/145 |
| 4,121,003 | A | * | 10/1978 | Williams | 428/42.1 |
| 5,380,695 | A | * | 1/1995 | Chiang et al. | 503/227 |
| 6,183,018 | B1 | * | 2/2001 | Braun et al. | 283/114 |
| 6,536,672 | B1 | * | 3/2003 | Outwater | 235/491 |

* cited by examiner

*Primary Examiner*—Michael G Lee
*Assistant Examiner*—Rafferty Kelly
(74) *Attorney, Agent, or Firm*—Mintz Levin Cohn Ferris Glovsky & Popeo, P.C.

(57) ABSTRACT

The present invention provides identification documents with security features. For example, a document may include two or more inks that are designed to cohesively fail upon a de-lamination attack. A resulting failure pattern is preferably difficult to predict. The two or more inks are applied to an identification document including a core and laminate layer. At least one of the inks is characterized such that an adhesive strength of the ink to the core and an adhesive strength of the ink to the laminate layer is each greater than the cohesive strength of the ink itself. Thus, the ink rips apart in a somewhat random-like manner upon a de-lamination attack. The ink can be arranged in interwoven or interlocking patterns or in other desired patterns and locations.

10 Claims, 6 Drawing Sheets

INK WITH COHESIVE FAILURE AND IDENTIFICATION DOCUMENT INCLUDING SAME

RELATED APPLICATION DATA

This application is a continuation of U.S. patent application Ser. No. 10/329,315, filed Dec. 23, 2002 (now U.S. Pat. No. 7,143,950). The Ser. No. 10/329,315 application claims the benefit of U.S. Provisional Patent Application Nos. 60/344,698 and 60/344,687, each filed on Dec. 24, 2001. The Ser. No. 10/329,315 application is also a continuation-in-part of U.S. patent application Ser. No. 09/969,200, filed Oct. 2, 2001 (now U.S. Pat. No. 6,827,277). Each of the above-identified U.S. Patent documents is hereby incorporated herein by reference.

TECHNICAL FIELD

The present invention is generally related to identification documents. In one implementation an identification document is printed with ink that is designed to cohesively fail upon intrusion.

BACKGROUND AND SUMMARY

Identification documents (hereafter "ID documents") play a critical role in today's society. ID documents are used on a daily basis—to prove identity, to verify age, to access a secure area, to evidence driving privileges, and/or to cash a check, and so on.

Airport security has increased. Passengers are now required to show an ID document during check in, security screening, and prior to boarding their flight.

We also live in an ever-evolving cashless society. ID documents can be used to make payments, access an ATOM, debit an account, or make a payment, etc.

(For the purposes of this disclosure, the use of the terms "identification document" and "ID document" is intended to include at least all types of ID documents. Note that the terms "document," "card," "badge" and "documentation" are used interchangeably herein. In addition, ID documents are broadly defined herein and include (but are not limited to), documents, magnetic disks, credit cards, bank cards, phone cards, passports, driver's licenses, network access cards, employee badges, debit cards, security cards, visas, immigration documentation, national ID cards, citizenship cards, social security cards and badges, certificates, identification cards or documents, voter registration cards, police ID cards, border crossing cards, security clearance badges and cards, gun permits, badges, gift certificates or cards, membership cards or badges, tags, CD's, consumer products, knobs, keyboards, electronic components, etc., or any other suitable items or articles that may record information, images, and/or other data, which may be associated with a function and/or an object or other entity to be identified.)

The ID document counterfeiter remains surprisingly resourceful. Improvements are needed to stay ahead of the counterfeiter. One counterfeiting technique involves a de-lamination attack. Consider an ID document that includes a printed substrate covered by a laminate layer. A de-lamination attack removes the laminate layer, sometimes with the aid of heat, to access information printed on the substrate. Once revealed, the counterfeiter can alter the printed information and reuse the substrate or laminate.

Some ID documents are susceptible to this type of attack. Consider the ID document including a substrate, ink applied to the substrate (or laminate layer) to convey information and a laminate layer covering the ink and substrate. Conventional inks generally include a strong adhesion to either a document substrate or to a laminate. A counterfeiter can use this design characteristic (adhesion) to his advantage. Upon de-lamination, the ink may adhere to the substrate layer or to a laminate layer. Regardless, the printed information is typically preserved on at least one layer and may be used again. (For example, if the ink adheres to a laminate, the counterfeiter can reuse the laminate. Or if the ink adheres to the substrate, the counterfeiter can perhaps alter the information by applying additional ink, or simply reuse the remaining information on the substrate.).

Figure 1:
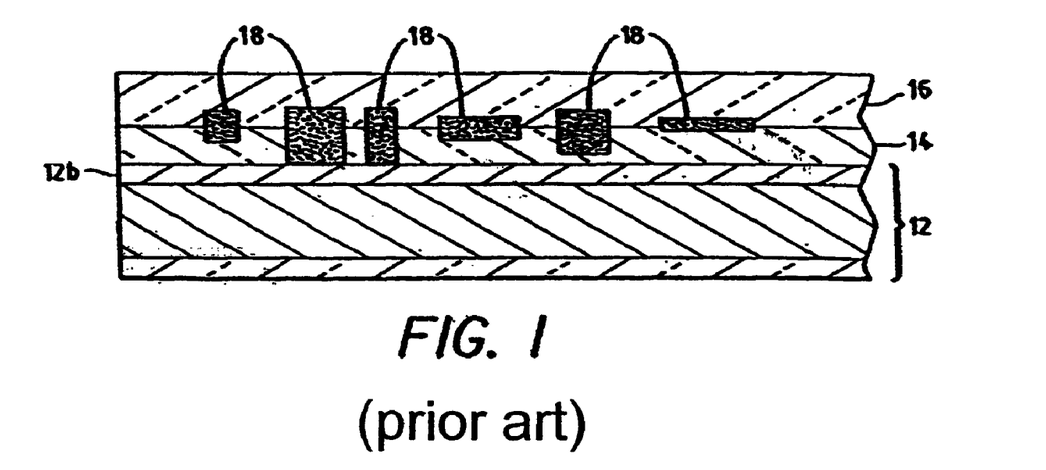
FIG. 1 is a cross-sectional view of a known ID document including a polymeric layer.
Figure 2:
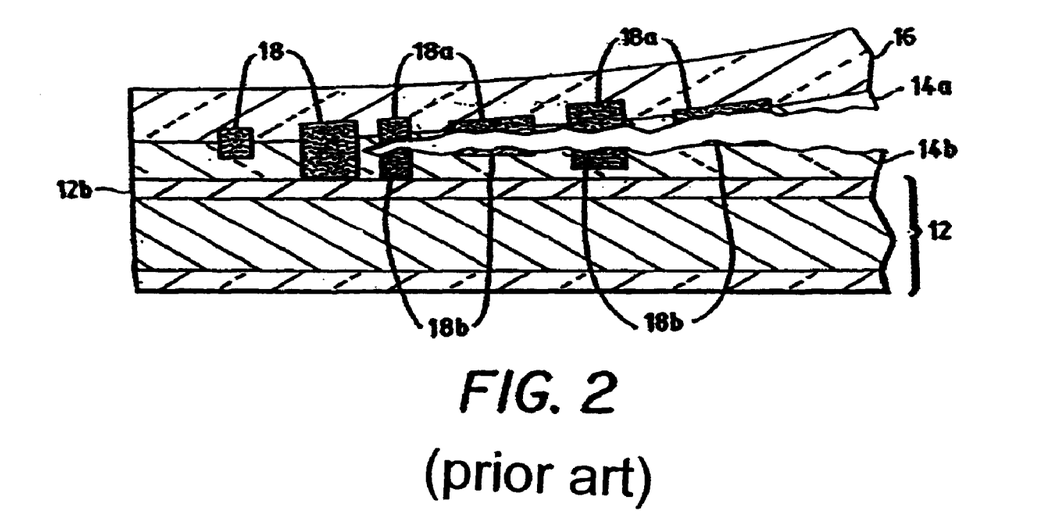
FIG. 2 is a cross-section view of FIG. 1, but showing the polymeric layer partially partitioned.

U.S. Pat. No. 5,380,695, herein incorporated by reference, discloses an identification document designed to help deter intrusion attempts. With reference to FIG. 1, an image-receiving element 10 includes a support 12, a polymeric security layer 14 including printing, and an image-receiving layer 16. The polymeric security layer 14 is designed such that its cohesively is less than its adhesivity for each layer that is contiguous thereto (layers 16 and 12b). A printed security pattern 18 is hopefully destroyed (into pieces 18a and 18b) through partitioning of the security layer 14 during an attempted de-lamination of the image-receiving layer 16 from the image-receiving element 12b (see FIG. 2).

The present invention provides improvements and efficiencies over the prior art. According to one aspect of the present invention, we provide ink that is designed to include about the same degree of adhesion to both a substrate layer and to a laminate layer. The adhesion strength is preferably greater than the cohesion strength of the ink. The security ink can be applied in a pattern. Upon de-lamination, the pattern is destroyed, e.g., preferably in an unpredictable manner, since the ink adheres to both the laminate and substrate. (We sometimes refer to this type of ink as "cohesive de-lamination ink," "cohesive failure ink," or "cohesively failing ink."). The de-laminated substrate will generally include part of the ink pattern, while the other part of the pattern generally remains with the laminate. Realigning the pattern is terribly difficult. An advantage of this inventive aspect is, e.g., that the ink itself exhibits the adhesive and cohesive characteristics, without relying on an additional layer, reducing the cost of an ID document. Other advantages in some implementations may include, e.g., improved water resistance, heat intrusion resistance and improved adhesion.

An inventive aspect of one implementation is to provide cohesive failure ink in intertwined or complementary patterns. Consider a staircase or double helix pattern. If a de-lamination attack is made on a document including such interlocking patterns arranged with cohesive failing ink, cohesive failing ink cohesively de-laminates. Reusing the laminate and/or substrate is nearly impossible since the interlocking structure is extremely difficult to realign.

According to still another aspect of the invention, we provide cohesively failing ink in first and second adjacent areas on an ID document. The ink in the first area includes a first color pigment, while the ink in the second area includes a second color pigment. The adjacently provided colors preferably cooperate, perhaps forming an interlocking pattern or border. The human eye is sensitive to color and contrast changes. If an attempt is thereafter made to reattach a de-laminated substrate and laminate, overlap or unexpected spacing between originally adjacent areas of color pigments will typically become apparent.

According to another aspect of the present invention, an identification document is provided to include a core (or substrate) having a top surface and a bottom surface; a top over-laminate is adjacently provided with the core top surface; and ink is provided on a surface of the core (or over-laminate). The ink is characterized by including substantially the same degree of adhesion to both the core and to the over-laminate. The adhesion of the ink to the core and the adhesion of the ink to the top laminate are each relatively stronger than a cohesive strength of the ink.

According to yet another aspect of the present invention a method of making a tamper-resistant identification document is provided. The method includes the steps of: providing a core including a top surface; providing ink deposited on the core top surface; and providing a top over-laminate in contact with the ink and core top surface. The ink is characterized by having relatively lower cohesion strength as individually compared to each of an adhesion strength between the ink and over-laminate and an adhesion strength between the ink and the core.

Another aspect of the present invention is an identification document including a substrate having a first word printed thereon in first ink, and a laminate having a second word, which comprises the first word, printed thereon. The second word is spatially shifted with respect to the first word, and is printing with optical variable ink. The shifting is preferably slight, so as to create a shading effect for the first word when the second word reflects light.

Still another aspect of the present invention is a method of providing security for an identification document. The document includes a substrate and a laminate. The method includes the steps of: providing the substrate or laminate to receive ink thereon, and providing optical variable ink in a first location on the substrate or laminate. The optical variable ink includes a first component that reflects light at a first viewing angle, and a second component that reflects light at a second viewing angle. The optical variable ink is provided such that when the first component is active the second component is passive.

Further features and advantages of the present invention will become even more apparent with reference to the following detailed description and the accompanying drawings.

BRIEF DESCRIPTION OF THE DRAWINGS

Of course, the drawings are not necessarily presented to scale, with emphasis rather being placed upon illustrating the principles of the invention. In the drawings, like reference numbers indicate like elements.

DETAILED DESCRIPTION

Figure 3:
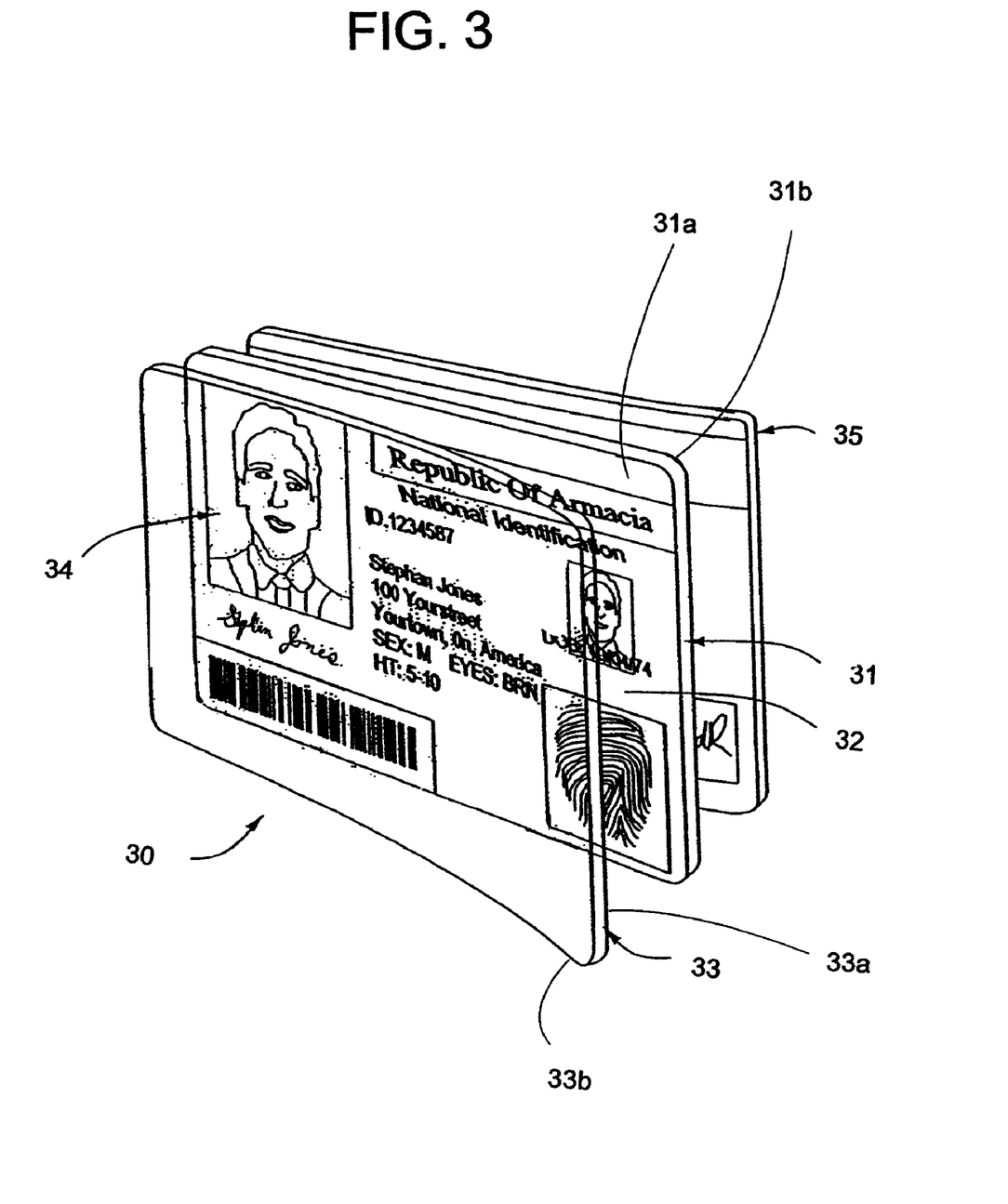
FIG. 3 is an illustrative example of an identification document in accordance with one implementation of the present invention.

The following description proceeds with reference to FIGS. 3-6B. FIG. 3 illustrates an identification document 30 according to one aspect of the present invention. Identification document 30 preferably includes a substrate (or core) 31 having a first (e.g., front) 31a and second (e.g., back) 31b surface. At least the first surface 31a is provided with indicia (e.g., information provided via ink or dye in areas 32, 34). Of course, the second substrate 31b surface can receive indicia if desired. The substrate 31 is preferably covered with a protective laminate 33 (and 35). In some embodiments, the substrate 31 comprises TENPIN. (TENPIN is a synthetic provided by PG Industries, Inc., One PG Place, Pittsburgh, Pa. 15272 USA). In other embodiments, the substrate 31 comprises, e.g., a polymer, composite, paper, synthetic paper, polyester, PET (polyethylene terephthalate), polycarbonate, etc. The laminate 33 (or 35), in some embodiments, comprises, e.g., a polyester, polycarbonate, polyurethane, polystyrene, cellulose ester, polyolefin, polysulfone, polyamide, PET (polyethylene terephthalate), synthetic, etc. And/or an adhesive layer or coating. Some suitable adhesives include polyester, polyethylene terephthalate, polyester urethane, polyether urethane, polyolefin, and/or hot melt or ultraviolet or thermally cured adhesive, etc., etc. Of course, document 30 can optionally include additional layers, including additional laminates and adhesives. (It should be appreciated that the present invention encompasses identification documents including more or less information, layers and/or features than are illustrated in FIG. 3. For example, the illustrated document 30 shows a 2-D bar code and biometric information (fingerprint). These features are optional, and are not required to practice the present invention. Our inventive techniques will also improve so-called "coreless" identification document as well.).

Dimensions of ID document 30 will vary according to specified design requirements. For example, applicable International Organization for Standardization (ISO) specifications for identification documents may specify required dimensions. Within specified dimensions there is some dimension play. In one implementation, we provide a 4-20 mil (where 1 mil is about 25 μm) core 31 and 3-15 mil laminate layers 33 and 35. Our most preferred implementation provides a 10 mil back laminate (e.g., a layered film or web with a laminate layer including about 7 mils and an adhesive layer including about 3 mils), a 10 mil core, and a 10 mil front laminate (e.g., a layered film or web with a laminate layer including about 7 mils and an adhesive layer including about 3 mils).

Figure 4:
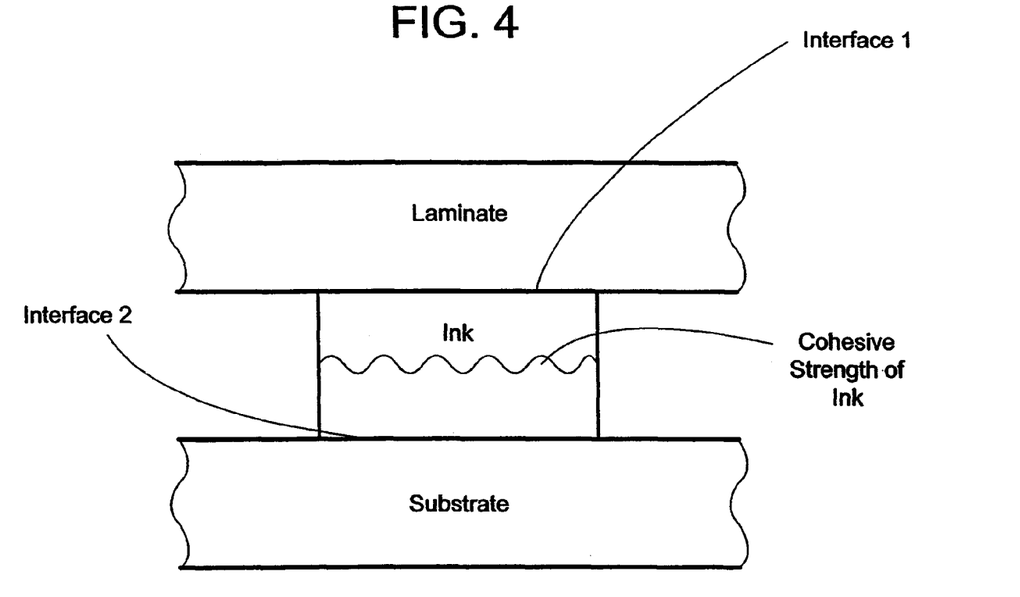
FIG. 4 is cross-sectional view of an identification document including cohesive failure ink.
Figure 5A:
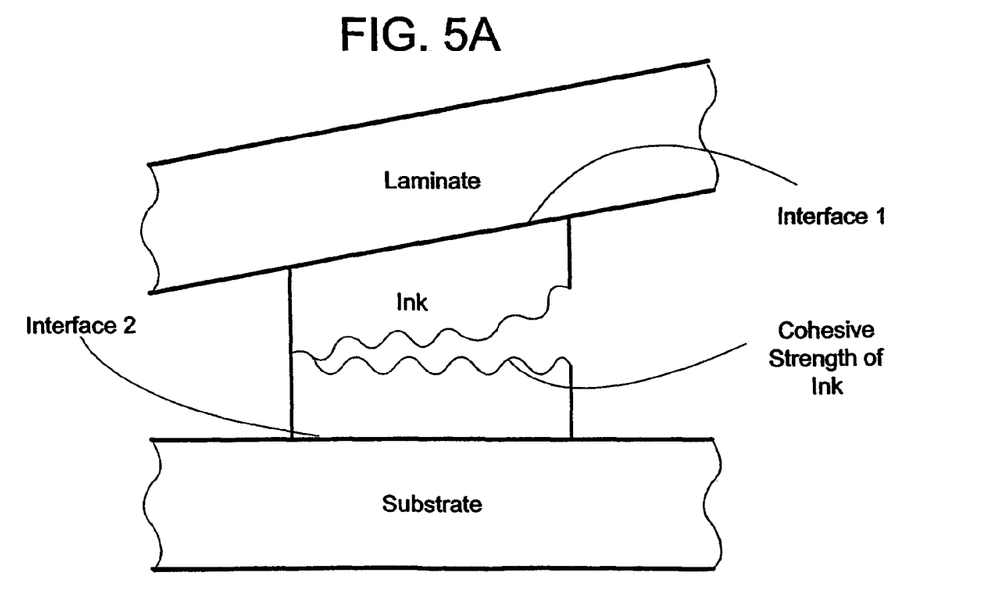
FIG. 5A is a cross-sectional view of the FIG. 4 identification document, showing ink cohesively delamination.
Figure 5B:
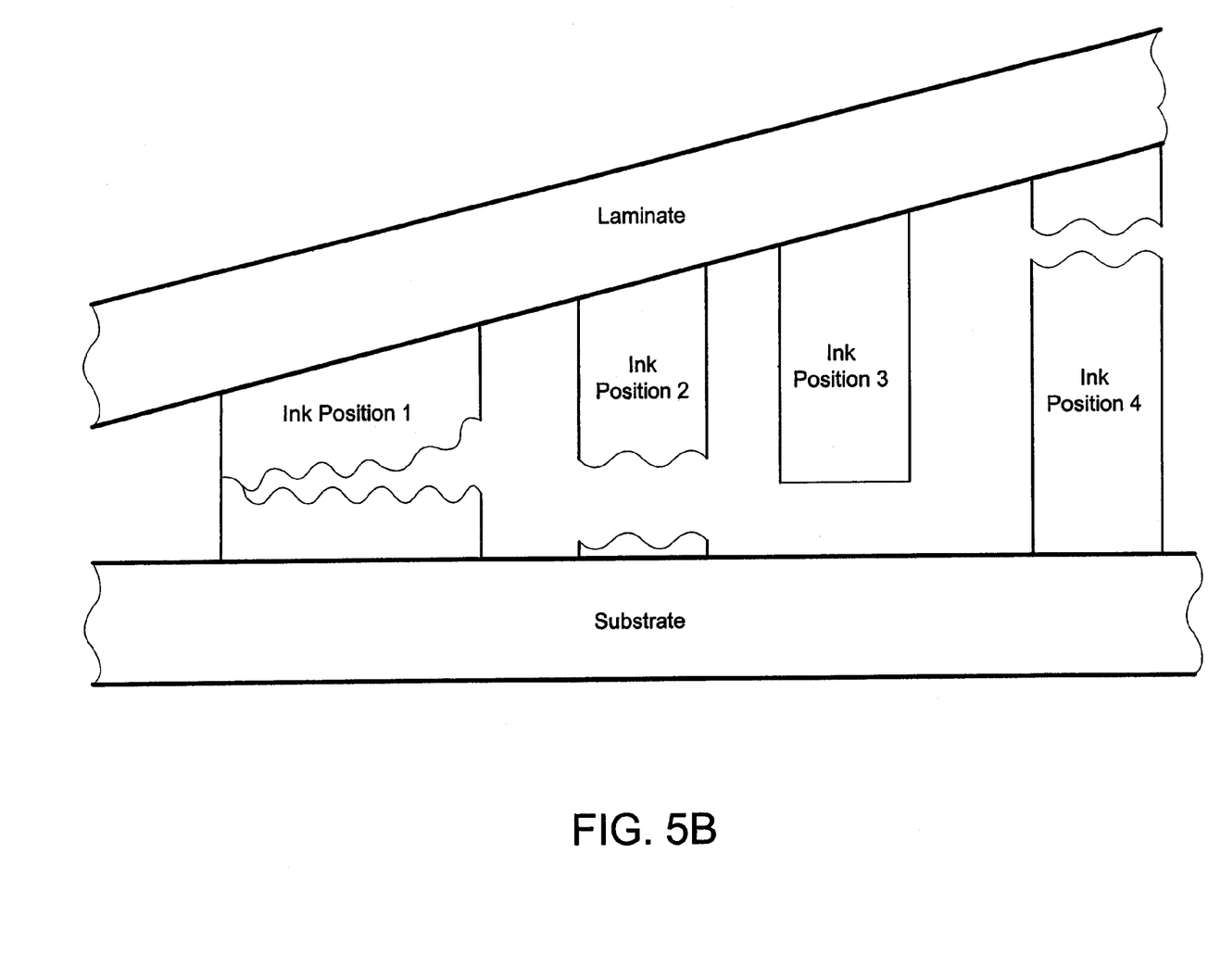
FIG. 5B is a cross-sectional view of an identification document showing ink cohesively delamination at a plurality of identification document positions.

We have developed inks that are preferably designed to have about the same degree of adhesive strength to both a substrate layer and a laminate layer. With reference to FIG. 4, we illustrate a cross-sectional view of an ID document, including a substrate, ink and laminate layer. (FIGS. 4, 5A and 5B have been exaggerated to ease discussion of this aspect of the invention. It will be appreciated that ink may migrate into a substrate and or laminate layer. It will also be appreciated that the spacing shown around the ink in FIGS. 4, 5A and 5B is not necessary, and will generally be filed by laminate, adhesive and/or substrate.). The ink interfaces with the laminate (at interface 1) and substrate (at interface 2). The ink's adhesion strength at interface 1 and interface 2 is preferably similar. The ink includes a cohesive strength, which is generally a measure or indication of the relative cohesion of the ink itself. A preferred relationship between the ink's adhesion at interface 1 and 2 and the ink's cohesive strength can be generalized as follows:

$$\text{Adhesion at Interface 1} \approx \text{Adhesion at Interface 2} > \text{Cohesive strength of ink} \quad (1)$$

An attempt to separate the substrate from the laminate preferably results in substantial impairment of a pattern printed with cohesive failure ink because the adhesion strength of the ink to both the laminate and substrate exceeds the cohesion strength of the ink itself—resulting in a cohesive de-lamination (FIG. 5A). The result of a cohesive de-lamination may be varied. In fact, an advantage of one implementation of cohesive failure ink is that a resulting cohesive failure pattern is rather unpredictable. Since the cohesive failure ink preferably adheres to the substrate and laminate with about similar strengths, and since the de-lamination attack may involve uneven (or not equally distributed) stresses and temperature, a resulting de-lamination pattern can be rather unpredictable, or at least, very difficult to predict or replicate. Accordingly, upon a de-lamination attack there may be some ink positions where the majority of the ink remains with the laminate (see Ink Position 2 in FIG. 5B), other ink positions where the majority of ink remains with the substrate (see Ink Position 4), and still other positions where the ink is somewhat equally distributed between the substrate and laminate (see ink position 1). In other cases, depending, e.g., on the stresses and temperature involved in an attack, there may be even some positions where ink is substantially severed at discrete locations from either the laminate or substrate (see Ink Position 3). A resulting de-lamination pattern is generally very difficult to realign when trying to reuse a delaminated laminate and substrate since the cohesively failing ink generally (and usually unpredictably) be distributed on both the laminate and substrate.

General Procedure Approaches

One technique for making cohesive failure ink with suitable adhesion and cohesion properties proceeds through manipulating or selecting a resin used to bind ink in relation to substrate and laminate materials. For example, if the laminate and substrate materials are polyolefin, then the evaluation may explore resins that have excellent adhesion to polyolefins. Or if an ink or resin is found to unpredictably cohesively fail, adhesion characteristics of the ink to specific laminate and substrate materials can be investigated. (We note that low molecular weight resins (e.g., pressure sensitive resins) are generally not ideal candidates for evaluation, because the tackiness of the material and low heat resistance. Generally, this type of material is difficult to print and roll without it sticking.).

Another approach analyzes the cohesive failure of ink resins, and then maps the relative cohesive strength to the adhesive strength of the ink to various substrate/laminate materials. A desired resin is determined from such matching.

Still another approach first identifies a resin material (e.g., a polymer) that has adhesion to a specific substrate and laminate material (e.g., a polymer). The resin material is used with color pigments to form ink. The ink is used with the specific substrate and laminate material. Yet another approach formulates ink to have a specific adhesion to a substrate and laminate (e.g., tweaking a resin and pigment to achieve a particular bond).

Cohesive failure ink can be printed in a variety of methods, for example: screen printing, offset printing, gravure printing, laser or ink jet printing, among many other types of printing. We even envision our inventive techniques being applied to ink or dye used for thermal transfer ribbons and panels.

A few ink examples are provided below. The disclosure of these examples should not be interpreted as limiting the scope of the present invention. Indeed, there are many formulations that fall under the scope of the present invention.

Example 1

VERSAMID 750—polyamide, an ink resin formulation, by percentage of weight:
Formation:

| | |
|---|---|
| VERSAMID 750 (resin) | 20.0% |
| n-Propanol | 60.0% |
| Color Pigment (ink coloration) | 20.0% |

A suitable supplier for the VERSAMID 750 is Henkel Corporation, located in Ambler, Pa. USA. This ink can be printed (e.g., gravure, screen printed, etc.) onto a substrate (e.g., TENPIN) or laminate (e.g., polycarbonate or polyurethane). Suitable laminate can be provided, e.g., by GE Plastics, headquartered in Pittsfield, Mass. USA. The substrate can then be bonded to a laminate. We found that this ink formation cohesively, and generally unpredictably, de-laminates upon de-lamination attacks starting at room temperature through elevated temperatures. We can, of course, broaden the ranges of these materials as follows: VERSAMID 750 (resin)—1-40%; n-Propanol—40-70%; and Color Pigments 5-40%. There are many, many suitable pigments, such as those provided by Ciba Geigy in Basel, Switzerland (e.g., Microlen, Cromophtal, Graphitan 7525 carbon black, among many others); Rohm and Haas (e.g., Morton); and Mearl (Englehard), among other suppliers. Other suitable pigments include those listed in this document among other pigments used in identification document printing.

EXAMPLE 2

SAA—Copolymer of Styrene and Allyl alcohol, by percentage of weight:
Formulation:

| | |
|---|---|
| SAA (e.g., SAA 100 or 101) (resin) | 20% |
| n-Propanol | 60% |
| Color Pigment (ink coloration) | 20% |

A supplier of the SAA resin is Lyondell Chemical Co., headquartered in Houston, Tex. USA. Suitable pigments include those listed in this document among other pigments used in identification document printing. The Example 2 ink can be printed to a substrate (e.g., TENPIN) or laminate (e.g., polycarbonate, polyester, polyurethane, and/or similar adhesives). And the laminate and substrate can be bonded at a, e.g., 220°-240° F. interface temperature. Samples were intruded upon (de-lamination attacked) starting at room through elevated temperatures. We found a generally random-like cohesive de-lamination resulting in the distribution of ink to both substrate and the laminate. We can of course, broaden the ranges of these materials as follows: SAA (resin)—1-40%; n-Propanol—40-70%; and Color Pigments 5-40%.

These are but a few of the many formulations that can yield cohesive failure properties.

Spatial and Color-Based Security Patterns

We have found that cohesive failure ink can be advantageously arranged in spatial patterns and/or color-based patterns. For example, cohesive failure ink can be used to create an interlocking or cooperating spatial design such as a circular staircase, helix structure, intertwined mesh, rings, background lines and patterns, etc. After cohesive de-lamination, where part of a design resides on a laminate layer and part of the design resides on a substrate, the design becomes very difficult to replicate or piece back together. A counterfeiter, if desiring to reuse either the original laminate or substrate, must now worry about replacing the design with near exactness in order to preserve the spatial design. This becomes a difficult task when considering the heat and/or pressure involved in a lamination process and a resulting de-lamination pattern (e.g., see FIG. 5B). Of course, cohesive failure inks can also be used to provide indica (e.g., information, state or national seals and emblems, designs, machine-readable code, text, etc.) that is conventionally found on identification documents.

Figure 6A:
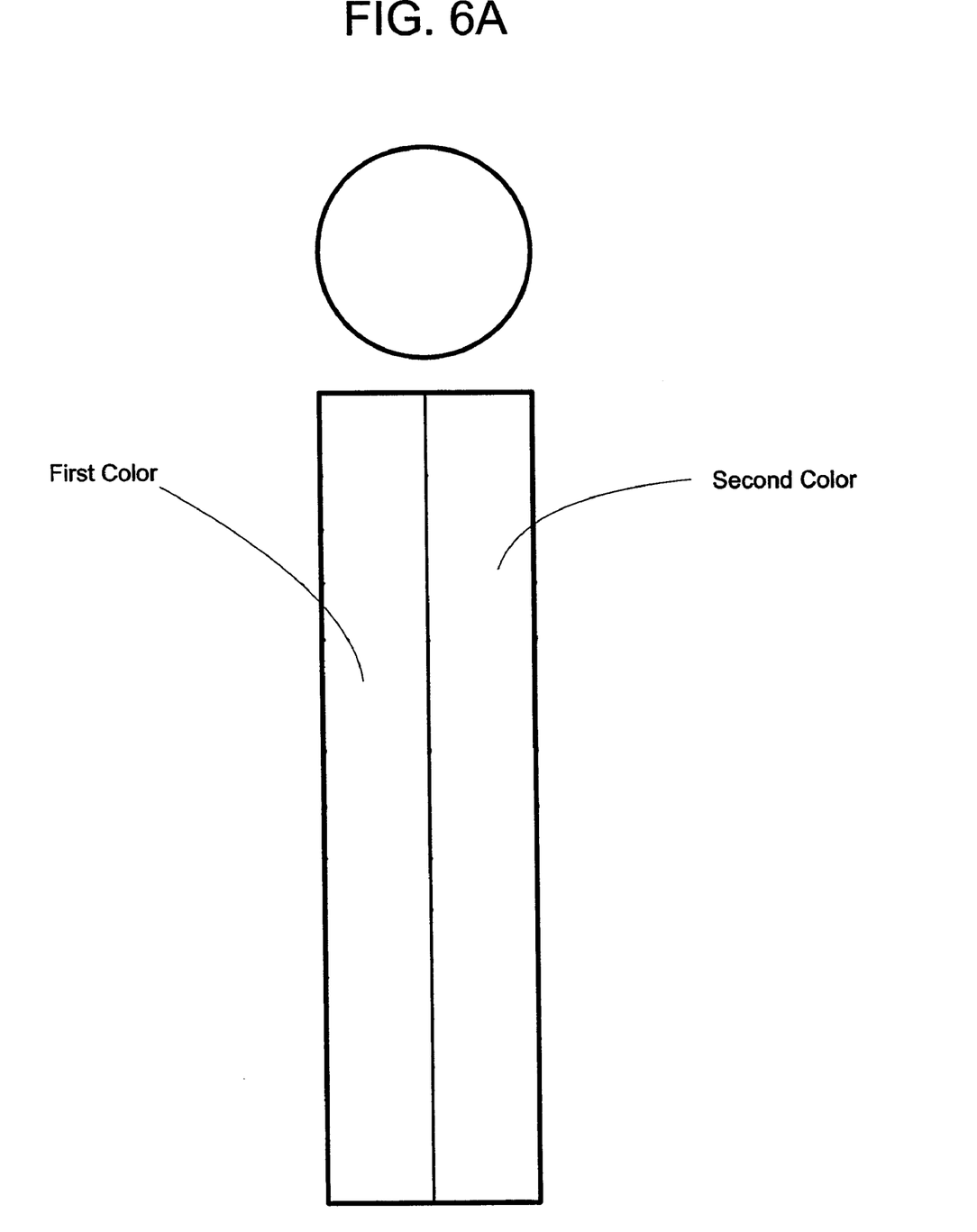
FIGS. 6A and 6B are diagrams showing alignment of security ink with two or more colors.
Figure 6B:
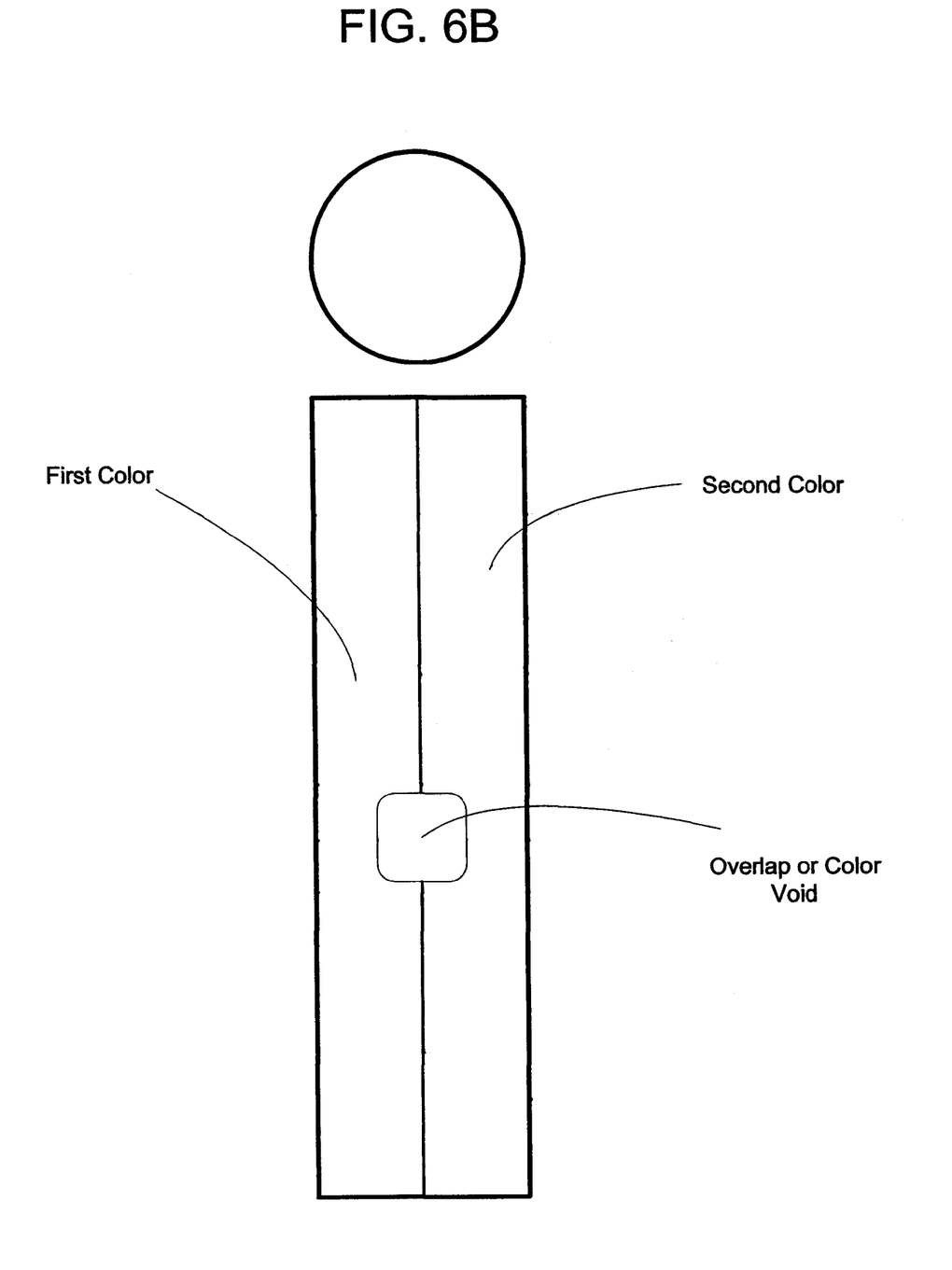

We know that the human eye is sensitive to color contrast and color change. We can exploit this sensitivity when creating a security pattern. With reference to FIGS. 6A and 6B, we provide a design or text character (herein FIGS. 6A and 6B, e.g., the letter "i"). We provide a first portion of the letter with a cohesive failure ink including a first color pigment, and a second portion of the letter with a cohesive failure ink including a second different color pigment (FIG. 6A). The human eye notices the border between the two colors. A counterfeiter will have a difficult time avoiding color overlap (which will produce an appearance of a third or shaded color) or color voids when piecing together a de-lamination attacked ID document (FIG. 6B). We, of course, can expand our color arrangement techniques to other multi-color designs and patterns as well.

Improvements Using Pearlescent and other Pigments

Cohesive failure ink may additionally include pearlescent, ultraviolet or infrared pigment/properties. We sometimes interchangeably use the terms "pearlescent" and "optically variable." (See our parent U.S. patent application Ser. No. 09/969,200 and corresponding PCT application no. PCT/US02/31786, each herein incorporated by reference, for an even further discussion on these types of pigments and inks.). A security design becomes even harder to piece back together after de-lamination when including such pearlescent, ultraviolet and/or infrared materials.

A security pattern can be integrated with a bond or seal existing between a protective cover sheet or film (laminate) and an information-bearing surface of an identification document. Some of the light-reflective materials contemplated by the present invention are preferably known products of commerce and include, e.g., materials and/or pigments consisting of flat irregularly shaped mica platelets coated with titanium dioxide and/or iron oxide. The carrier may be colored with other compatible transparent materials and/or dyestuffs to produce a resultant color that will produce the desired effect and be compatible with the background. The textural quality of the pearl finish is adjustable through alteration of the particle sizes—fine particles produce a satin effect while large particles yield a glitter or sparkle effect. More precisely, light-reflective materials of the type described above which are particularly suitable for use in the present invention are those materials having an average particle size between 0 and 50 microns. For the purposes of this invention, "average particle size" means that the major portion of the material has a particle size between about 1 to about 50 microns although smaller portions of larger or smaller particles can be present.

Patterns comprising light-reflective materials of the above-discussed characteristics are distinctive in that the pattern is visible or discernable at least on close examination of the finished document but the pattern does not effectively obscure document information covered by the pattern. Thus, when the laminates are bonded, or otherwise secured together, the user preferably will be able to discern, looking upon the card, an iridescent design. Moreover, it is an added feature of this aspect of the invention that as the instrument is tilted and rotated, the design appears to come to life, resulting in a variable and optically active appearance.

Our inventive ideas can be extended to include multi-color designs (e.g., a staircase or helix structure) that would be constructed to include different color pigments. The result is a difficult pattern to reconstruct after delamination a document including cohesive failure color inks since a counterfeiter is forced to realign color-for-color and pattern-for-pattern.

Further Improvements

We note that ID documents can benefit from selective security designs and methods, including those printed with or without cohesive failure inks. Consider the implementations disclosed below.

One improvement uses a spatial security pattern that includes two or more colors. The pattern may include:

1. Words, objects, or designs in different colors of, e.g., red, green, blue; and 2. Making and using a color combination so that when one color is active the other color is passive (e.g., with optical variable inks (OVI) discussed in our parent Ser. No. 09/969, 200).

To achieve number 2, above, we can select two OVIs each including a different reflectance angle. The two OVIs can be printed at the same location or at complimentary (or intertwined) positions.

Another security pattern uses complimentary/contrasting OVI colors. For example, we can use red/gold (a pearlescent pigment) and gold/red (pearlescent pigment), green/gold (pearlescent pigment) and gold/green (pearlescent pigment). These types of pigments include two different colors when reflected at two different angles. For example, a Red/Gold pearlescent pigment may exhibit red with direct light (e.g., at a first angle) and exhibits gold with reflected light (e.g., at a second angle).

Single color pearlescent pigments can also be selected to match, contrast, and/or serve as a background color of an ID document substrate. For example, we can use blue OVI with a card that has a blue background. (We note that our experiments suggest that blue OVI does not have the same desire optical robustness when used with tan background card.) The blue OVI ink also advantageously disappears into the background color when the blue OVI is not showing (or reflecting)

Still another method applies a layer of pearlescent ink (e.g., white) and then overprint with an ink, dye and/or pigment. For example, we can apply such a background coat over which variable data is to be printed. (Variable data is typically that data which is unique to a cardholder or issuing authority. The variable data will typically change from card to card and may include, e.g., name, birth date, biometric data, address, age, identification number, photograph, signature, etc.). Detecting an alteration of the variable data may be difficult. Yet, if the variable data is disturbed, the background section will likely be disturbed also. A variable data disturbance can, therefore, be detected by noticing that the background pearlescent coating has been disturbed.

Another pattern provides shading to simulate a 3-D like effect. We print a word with regular ink. We then print the same word, this time with an optical variable ink (e.g., white pearlescent ink), but slightly shifted in one direction. We can reprint the same word, again in optical variable ink (e.g., again in white pearlescent ink), but shifted in other directions as well. The result is a shading effect, when held at a reflecting angle (or at various angles if multi-different OVI inks are used). In some of the above implementations, we provide the first word on a document substrate, and we provide the second or subsequent words in optical variable ink on an adjacently arranged laminate layer. Or we can provide some or all words on a laminate layer. These offsetting techniques work well to shade or emphasize a design or graphic as well.

Variable Designs

Ink can be arranged in patterns or text to convey variable data. The placement of variable data can be important in some identification document implementations. Accordingly, in these implementations, we prefer that variable data appear on or under the face of a photograph or portrait. When printed in OVI ink, the variable data is discernable when the card is held at a reflecting angle. This technique makes replicating (or cutting and pasting) a photograph onto another ID document very difficult. In some implementations, the variable data is printed with cohesive failure ink.

Another security design relies on the viewing angle (or angle of reflectance) of an OVI ink. We provide first OVI ink in a first spatial location on an ID document. We then provide second OVI ink (with a second, different viewing angle) at the same first spatial location or at an adjacent, second spatial location. The first and second OVI ink may even include different colors—say gold and silver. The design become visible in gold when view at a first viewing angle, and visible in silver when view at the second viewing angle.

Another technique prints a first word in red ink and then overprints (or under print) the same word in blue OVI ink. A second word can be printed with blue ink and then overprinted (or under printed) in red OVI ink. When the colors reflect, the first word (red) shows the blue and the second word (blue) shows the red. The pattern (and perhaps alignment of the words) of red/blue word and blue/red word can be monitored to determine whether a counterfeit attack has been attempted.

It will be appreciated that suitable ink materials and pearlescent pigments are available from, e.g., Mearl (now Engelhard) (e.g., under the trade names Flamenco, Mearlite, ReFlecks, etc.) And EM Industries (e.g., under the trade name Afflair, etc.). Of course there are many other pearlescents and materials that may be suitable interchanged with this aspect of the present invention.

Changing a Color's Shade—Example

Historically, color options for pearlescent ink has been limited. One way to expand the available pearlescent ink palette is to a shading options of a particular color. In one implementation, we provide shading for a pearlescent ink, e.g., for use with screen-printing. The formulation is set out below. Of course the proportions can be varied according to need, and alternative constituents can be interchanged as needed.

Formulation, in terms of percentage of weight:

| Klucel E | 13% |
| Arcosolv DPM | 36% |
| Arcosolv TPM | 36% |
| Pearlescent or OVI pigment | 15% |

Some example compositions, pigments and dyes that can be used in this and other examples disclosed herein include:

Klucel E (Hydroxypropylcellulose) is available from many suppliers including DD Chemco in Northridge, Calif. USA, Hercules, Inc. in Wilmington, Del., Conservation By Design, in the United Kingdom (Bedford).

Arcosolv DPM and Arcoslv TPM are both available from a number of suppliers including Lyondell in Houston, Tex. USA.

Pigments—Ciba Geigy (Basel, Switzerland)—e.g., Graphitan 7525 carbon black, microlith blue 4G-A, Morton International Inc. (Chicago, Ill. USA)—e.g., Phthalo blue R, Phthalo blue GS, Mearl (Englehard)—e.g., Magna pearl (1100).

Dyes—Giba Geigy—e.g., Orasol Blue GL, Orasol Brown 2RL, Morton—e.g., Morfast blue I 00, Morfast Red I o6, Morfast yellow 102.

Of course, other compositions, pigments and dyes can be suitably interchanged with this example implementation.

Another inventive anti-counterfeiting technique is to create OVI ink including a dye and white pearlescent pigment. Increasing a dye level (e.g., by 1-10% by weight or above) results in a color bleed when the card is immersed in solvent, or if a person tries to pry open the card with solvent washing.

Steganographic Messages Conveyed with Cohesive Failure Ink

Cohesive failure ink can be used to arrange a steganographic message, e.g., a so-called digital watermark, on an ID document surface. Digital watermarking, a form of steganography, is a process for modifying physical or electronic media to embed machine-readable indicia (or code) into the media. The media may be modified such that the embedded code is imperceptible or nearly imperceptible to the user, yet may be detected through an automated detection process. In some embodiments, the cohesive failure ink will convey two or more digital watermarks. In other embodiments, a digital watermark is "fragile" in that it is designed to degrade or be lost upon signal processing such as copying and/or reproducing. A watermark may also include a so-called calibration component. A calibration component is helpful in resolving image distortion such as rotation, scale, translation, etc.

Digital watermarking systems typically have two primary components: an encoder that embeds the digital watermark in host media, and a decoder that detects and reads the embedded digital watermark from a signal suspected of containing a digital watermark. The encoder embeds a digital watermark by altering the host media signal. (E.g., the encoder can make slight alterations to a graphic, background pattern or photograph that is to be printed with cohesive failure ink (or other inks as well) on an identification document. The alterations may be to pixel values, DCT coefficients corresponding to the host media signal, a transform domain representation of the host media signal, etc., etc.). The reading component analyzes a suspect signal to detect whether a digital watermark is present. In applications where the digital watermark encodes information (e.g., as a payload or message bits), the reader extracts this information from the detected digital watermark. The reading component can be hosted on a wide variety of computing devices (e.g., hardware and/or software based) including personal computers, tethered or wireless reader devices, conventional PC-connected cameras and computers, mobile readers with built-in displays, etc. By imaging a watermarked surface of an identification document, the watermark information can be read and decoded by a reader.

Several particular digital watermarking techniques have been developed. The reader is presumed to be familiar with the literature in this field. Some techniques for embedding and detecting imperceptible watermarks in media signals are detailed, e.g., in the assignee's co-pending U.S. patent application Ser. No. 09/503,881 (now U.S. Pat. No. 6,614,914), U.S. Pat. No. 6,122,403 and PCT patent application PCT/US02/20832, which are each herein incorporated by reference.

A digital watermark conveyed through cohesive failure ink will generally be destroyed in a de-lamination attack, due to the random-like destruction of a pattern including the watermark. Realigning the pattern (e.g., reusing a laminate and substrate) with the precision typically needed to convey a digital watermark will be nearly impossible to achieve due to the steganographic nature of a digital watermark.

Inventive Combinations

In addition to the inventive aspects detailed above and in the claims, some of our inventive combinations include the following:

A. A method of making a tamper-resistant identification document comprising the steps of:
providing a core including a top surface;
providing a top laminate including a top surface and bottom surface; and
providing ink on at least one of the top surface of the core and the bottom surface of the top laminate,
wherein the ink is characterized by having a relatively lower cohesion strength as compared to each of an adhesion strength between the ink and over-laminate and an adhesion strength between the ink and the core.

A1. The method of combination A, wherein the ink comprises a polymer-based resin.

A2. The method of combination A, wherein the ink comprises a styrene-allyl alcohol copolymer.

A3. The method of combination A, wherein the ink comprises a first color and a second color.

A4. The method of combination A3, wherein the first color and the second color are provided on the top surface of the core in an interlocking pattern.

A5. The method of combination A3, wherein the first color and the second color are adjacently arranged.

A6. The method of combination A, wherein the ink comprises an optically variable pigment.

A7. The method of combination A, wherein the ink comprises at least one of ultraviolet and infrared pigment.

A8. The method of combination A, wherein the core comprises TENPIN, and the laminate comprises a polymer, and the ink comprises by weight:

| | |
|---|---|
| Versamid 750 (resin) | 20.0% |
| n-Propanol | 60.0% |
| Color Pigment (ink coloration) | 20.0%. |

A9. The method of combination A, wherein the core comprises TENPIN, the laminate comprises a polymer, and the ink comprises by weight:

| | |
|---|---|
| SAA (e.g., SAA 100 or 101) (resin) | 20% |
| n-Propanol | 60% |
| Color Pigment (ink coloration) | 20%. |

A10. The method of combination A, wherein the ink is provided so as to convey a steganographic message.

A11. The method of combination A10, wherein the steganographic message comprises a digital watermark.

A12. An identification document made according to the method of any one of combinations A-A11.

B. An identification document comprising:
a substrate having a first word printed thereon in a first ink; and
a laminate having a second word, which comprises the first word, printed thereon, but spatially shifted with respect to the first word, the second word being printing with optical variable ink.

B1. The identification document of claim B, wherein the shifting of the first word in comparison to the second word comprises a shading effect for the first word.

B2. The identification document of claim B1, wherein the shading effect produces a 3-D effect.

B3. The identification document of claim B, wherein the optical variable ink comprises white pearlescent ink.

C. A method of providing security for an identification document, the document comprising a substrate and a laminate, the method comprising the steps of:
providing the substrate or laminate to receive ink thereon; and
providing an optical variable ink in a first location on the substrate, wherein the optical variable ink includes a first component that reflects light at a first viewing angle, and a second component that reflects light at a second viewing angle;
wherein the optical variable ink is provided such that when the first component is in an active state the second component is in passive state.

C1. The method of claim C, wherein the active state reflects light at a predetermined angle.

C2. An identification document made according to the method of claim C.

D. A method of making an identification document comprising the steps of:
providing a core including a top surface;
providing a top laminate including a top surface and bottom surface;
providing ink on at least one of the top surface of the core and the bottom surface of the top laminate,
wherein the ink is characterized by having a relatively lower cohesion strength as compared to each of an adhesion strength between the ink and over-laminate and to an adhesion strength between the ink and the core, and wherein the ink is provided so as to convey a steganographic signal.

D1. The method of combination D, wherein the steganographic message comprises a digital watermark.

D2. The method of combination D, wherein the steganographic message comprises two or more digital watermarks.

D3. The method of combination D, wherein the steganographic message comprises a fragile digital watermark.

D4. The method of combination D, wherein the ink forms a pattern and the steganographic message comprises at least some changes to discrete cosine transformation coefficients that correspond to the pattern.

E. An identification document comprising:
a core including a front surface and a back surface;
an over-laminate including a front surface and a back surface, the back surface being adjacently positioned with said core front surface; and
ink provided on at least one of the front surface of the core and the back surface of the over-laminate, wherein the ink is provided so as to convey a steganographic signal, and wherein the ink is characterized by including about the same degree of adhesion to both the front surface of the core and to the back surface of the over-laminate, and wherein the adhesion of the ink to the front surface of the core and the adhesion of the ink to the back surface of the over-laminate is each relatively stronger than a cohesive strength of the ink.

E1. The document of combination E, wherein the steganographic message comprises a digital watermark.

E2. The document of combination E, wherein the steganographic message comprises two or more digital watermarks.

E3. The document of combination E, wherein the steganographic message comprises a fragile digital watermark.

E4. The document of combination E, wherein the ink forms a pattern and the steganographic message comprises at least some changes to discrete cosine transformation coefficients that correspond to the pattern.

E5. The document of combination E, wherein at least some of the ink is provided in the form of an image, and the steganographic message is embedded through subtle changes to the image.

E6. The document of combination E, wherein the steganographic message comprises a digital watermark.

E7. The document of combination E, wherein the back surface of the over-laminate comprises an adhesive.

F. An identification document comprising:
 a core layer;
 two layers of a substantially transparent polymer fixed to the core layer on opposed sides thereof; and
 machine-readable indica disposed on at least one of the core layer and one of the two layers of substantially transparent polymer, said machine-readable indica being generally imperceptible to a human viewer thereof, wherein said indica is provided via cohesively failing ink or dye.

F1. The identification document of combination F, wherein the indica comprises a digital watermark.

F2. The identification document of combination F, wherein the ink or dye is characterized by having a relatively lower cohesion strength as compared to each of an adhesion strength between the ink or dye and the at least one layer of substantially transparent polymer and to an adhesion strength between the ink or dye and the core.

G. An identification document comprising:
 a support;
 a polymeric security layer including a first surface and a second surface, the first surface being adjacently arranged with the support, wherein the polymeric security layer includes printing; and
 an image-receiving layer adjacently arranged with the second surface of the polymeric security layer,
 wherein the polymeric security layer is characterized such that its cohesively is less than its adhesivity for each of the image receiving layer and the support; and
 wherein the printing comprises a steganographic message.

G1. The identification document according to G, wherein the steganographic message comprises a digital watermark.

G2. The identification document according to G1, wherein the digital watermark comprises at least one of a calibration component and a message component.

Concluding Remarks

Having described and illustrated the principles of the technology with reference to specific implementations, it will be recognized that the technology can be implemented in many other, different, forms.

The technology disclosed herein can be used in combination with other technologies. Examples include the technology detailed in, e.g.: U.S. patent application Ser. No. 09/747,735, filed Dec. 22, 2000, (now U.S. Pat. No. 6,923,378); "CONTACT SMART CARDS HAVING A DOCUMENT CORE, CONTACTLESS SMART CARDS INCLUDING MULTI-LAYERED STRUCTURE, PET-BASED IDENTIFICATION DOCUMENT, AND METHODS OF MAKING SAME," (now U.S. Pat. No. 6,843,422); and U.S. Provisional Patent Application No. 60/429,115 (filed Nov. 25, 2002), which are each herein incorporated by reference. Also, instead of ID documents, some of our inventive techniques and documents can be employed with product tags, product packaging, business cards, bags, charts, smart cards, maps, labels, etc., etc. The term ID document is broadly defined herein to include these tags, labels, packaging, cards, etc.

To provide a comprehensive disclosure without unduly lengthening the specification, applicants herein incorporated by reference each of the patent documents referenced above.

The particular combinations of elements and features in the above-detailed embodiments are exemplary only; the interchanging and substitution of these teachings with other teachings in this and the incorporated-by-reference patent documents are also contemplated.

What is claimed is:

1. An identification document comprising:
 a core including a front surface and a back surface;
 an over-laminate including a front surface and a back surface, the back surface being adjacently positioned with said core front surface; and
 two or more inks provided on at least one of front surface of the core or the back surface of the over-laminate,
 the two or more inks being characterized as including substantially the same degree of adhesion to both the front surface of the core and to the back surface of the over-laminate,
 the adhesion of the two or more inks to the front surface of the core and the adhesion of the two or more inks to the back surface of the over-laminate each being relatively stronger than a cohesive strength of the ink, and
 the two or more inks are provided on the front surface or the back surface in a plurality of patterns, the patterns including at least a plurality of intertwined or interlocking circles or mesh structures, wherein a first ink of the two or more inks comprises patterns in a first color and a second ink of the two or more inks comprises patterns in a second, different color; and
 wherein the two or more inks cohesively delaminate upon an intrusion attempt, resulting in portions of the plurality of intertwined or interlocking circles or mesh structures in the first and second colors adhering to the first surface of the core and portions of the plurality of intertwined or interlocking circles or mesh structures in the first and second colors adhering to the back surface of the over-laminate, such that tampering is evident.

2. The document of claim 1, wherein the intrusion attempt comprises heat.

3. The document of claim 1, wherein the two or more inks comprise a styrene-allyl alcohol copolymer.

4. The document of claim 1, wherein the first ink comprises at least one of an optically variable ink or pearlescent ink.

5. The document of claim 1, wherein the first ink comprises at least one of an ultraviolet pigment or infrared pigment.

6. The document of claim 1, wherein the two or more inks comprise ultraviolet or infrared pigments.

7. The document of claim 1, wherein the first ink is designed to unpredictably cohesively fail.

8. The document of claim 1, wherein the back surface of the laminate comprises an adhesive.

9. A method of making a tamper-resistant identification document comprising:
 providing a core including a top surface;

providing a top laminate including a top surface and bottom surface; and providing two or more inks between the top surface of the core and the bottom surface of the top laminate, the two or more inks being characterized as including substantially the same degree of adhesion to both the top surface of the core and to the bottom surface of the top laminate, the adhesion of the two or more inks to the top surface of the core and the adhesion of the two or more inks to the bottom surface of the top laminate each being relatively stronger than a cohesive strength of the ink, the two or more inks being formed in a pattern, the pattern including at least a plurality of intertwined or interlocking circles or mesh structures, and a first ink of the two or more inks comprises a first color and a second ink of the two or more inks comprises a second, different color and wherein the two or more inks cohesively delaminate upon an intrusion attempt, resulting in portions of the plurality of intertwined or interlocking circles or mesh structures in the first and second colors adhering to the top surface of the core and portions of the plurality of intertwined or interlocking circles or mesh structures in the first and second colors adhering to the bottom surface of the top laminate, such that tampering is evident.

10. The method of claim 9, wherein the two or more inks comprise a polymer-based resin.

\* \* \* \* \*

UNITED STATES PATENT AND TRADEMARK OFFICE
CERTIFICATE OF CORRECTION

| | | |
|---|---|---|
| PATENT NO. | : 7,819,327 B2 | Page 1 of 1 |
| APPLICATION NO. | : 11/567061 | |
| DATED | : October 26, 2010 | |
| INVENTOR(S) | : Jones et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this
Tenth Day of May, 2011

David J. Kappos
*Director of the United States Patent and Trademark Office*